United States Patent [19]

Lazarus

[11] Patent Number: 5,409,122

[45] Date of Patent: Apr. 25, 1995

[54] TUBE CONNECTOR, MODULAR UNITS, AND MODULAR SHELVING SYSTEMS INCLUDING SUCH CONNECTORS

[75] Inventor: Abraham M. Lazarus, Herzlia, Israel

[73] Assignee: ALBA Ltd., Rishon Lezion, Israel

[21] Appl. No.: 94,999

[22] Filed: Jul. 23, 1993

[30] Foreign Application Priority Data

Jul. 31, 1992 [IL] Israel ........................ 102694

[51] Int. Cl.⁶ ............................................. A47B 43/00
[52] U.S. Cl. ..................................... 211/186; 108/144; 108/192; 403/297; 403/312
[58] Field of Search ............... 211/186, 182, 194, 189; 403/310, 311, 312, 171, 297; 108/144, 180, 192, 193

[56] References Cited

U.S. PATENT DOCUMENTS

| | | |
|---|---|---|
| 2,645,509 | 7/1953 | Valenta . |
| 3,620,558 | 11/1971 | MacMillan . |
| 3,834,549 | 9/1974 | Burg et al. ........................... 211/189 |
| 4,090,798 | 5/1978 | Barton ................................ 403/171 |
| 4,574,552 | 3/1986 | Korth . |
| 4,787,319 | 11/1988 | Dupraz . |
| 4,859,109 | 8/1989 | Targetti ............................... 403/297 |
| 4,934,858 | 6/1990 | Beaulieu ............................. 403/174 |
| 4,958,953 | 9/1990 | Charondiere ..................... 403/297 |
| 5,083,882 | 1/1992 | Liu ..................................... 403/297 |
| 5,102,254 | 4/1992 | Yeh ..................................... 403/174 |

FOREIGN PATENT DOCUMENTS

| | | |
|---|---|---|
| 567174 | 6/1973 | Switzerland . |
| 770335 | 3/1957 | United Kingdom . |
| 1373571 | 11/1974 | United Kingdom ................ 403/297 |

Primary Examiner—Ramon O. Ramirez
Attorney, Agent, or Firm—Benjamin J. Barish

[57] ABSTRACT

A modular unit for a shelving system includes a pair of tube connectors each made up of half-sections together having an outer transverse dimension slightly less than the inner transverse dimension of a tube to be connected thereto, a threaded fastener threaded through an opening in one half-section and abutting the other half-section to force apart the two half-sections and thereby to firmly clamp them to a tube, and a tie rod joining a half-section of one of the tube connectors to a half-section of the other tube connector.

14 Claims, 3 Drawing Sheets

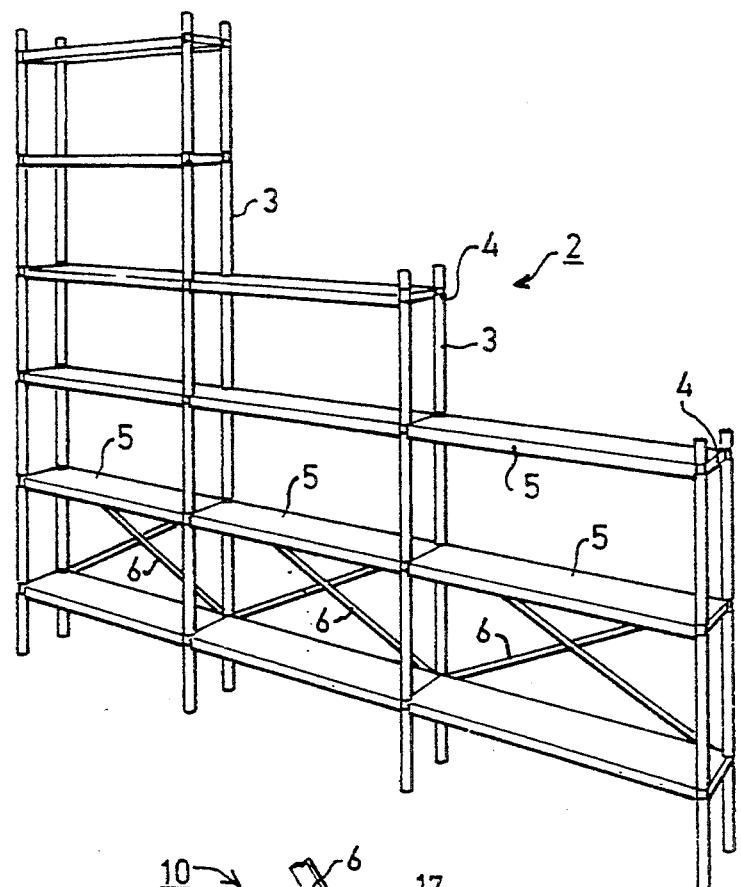
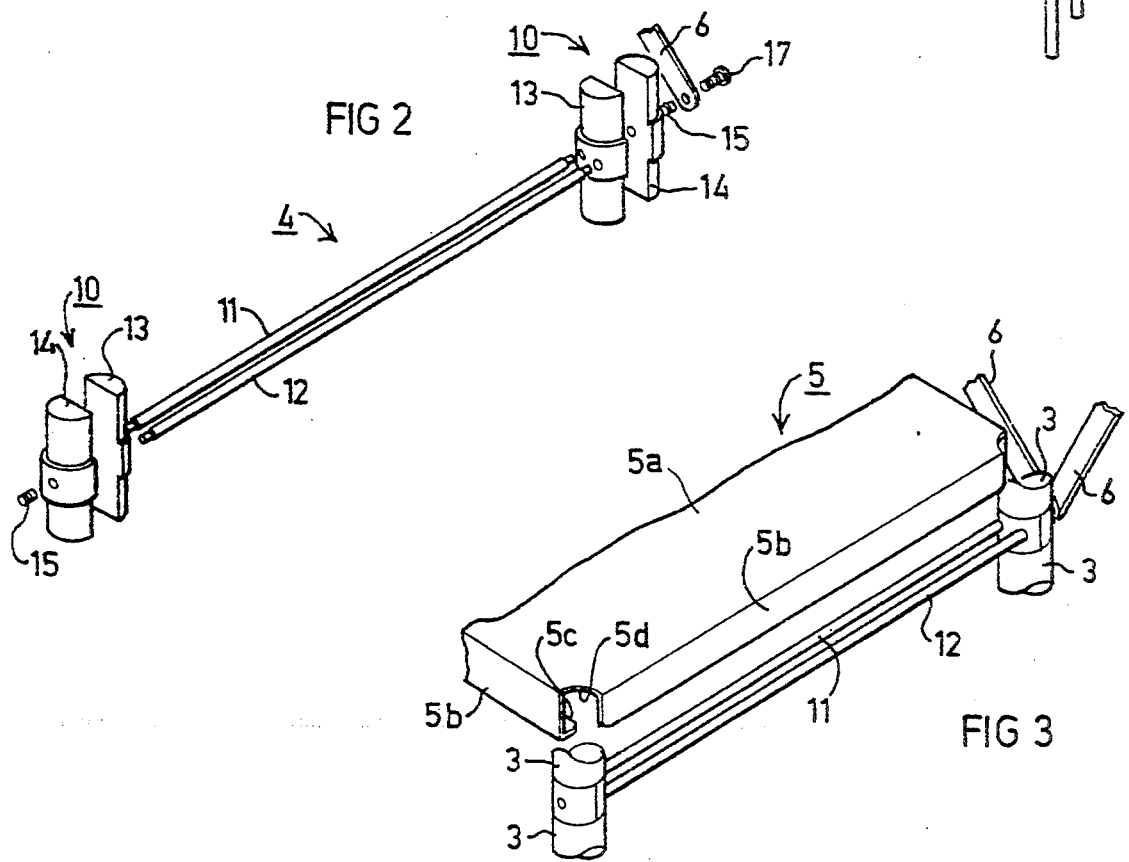

5,409,122

TUBE CONNECTOR, MODULAR UNITS, AND MODULAR SHELVING SYSTEMS INCLUDING SUCH CONNECTORS

FIELD AND BACKGROUND OF THE INVENTION

The present invention relates to tube connectors for connecting tubes to each other or to other objects. The invention also relates to modular units and to modular shelving sytems including such tube connectors.

A wide variety of different types of tube connectors have been developed and are available for connecting tubes to each other or to other objects, such as plates. Examples of such known tube connectors are described in U.S. Pat. Nos. 2,645,509, 3,620,558, 4,090,798, 4,574,552, 4,787,319, 4,859,109, 4,934,858, 4,958,953 and 5,102,254.

The invention of the present application is directed to a novel tube connector particularly useful as a modular unit for a modular shelving system to enable shelving systems of various configurations to be assembled in a simple and convenient manner as desired using only an Allen key.

BRIEF SUMMARY OF THE INVENTION

According to one aspect of the present invention, there is provided a modular unit for a shelving system, comprising a pair of tube connectors each including first and second half-sections together having an outer transverse dimension slightly less than the inner transverse dimension of a tube to be connected thereto. The first half-section is formed with a threaded opening passing transversely therethrough for receiving a threaded fastener; and the second half-section is formed on its inner face with an abutting surface engageable by the end of a threaded fastener, when threaded through the opening in the first half-section, to force apart the two half-sections and thereby to firmly clamp them to the tube. The modular unit further includes a tie rod joining a half-section of one of the tube connectors to a half-section of the other of the tube connectors.

According to a further aspect of the invention, there is provided a shelving system including a plurality of modular units as described above, a plurality of tubes to be assembled by the modular units, and a plurality of shelves each supportable along its opposite sides on the tie rods of two of the modular units when assembled together with their respective tubes.

According to a still further aspect of the invention, there is provided a tube connector comprising first and second half-sections together having an outer transverse dimension slightly less than the inner transverse dimension of a tube to be connected thereto. Each of the half-sections includes an end portion having the outer transverse dimension slightly less than the inner transverse dimension of the tube to be connected thereto; an intermediate portion having an outer transverse dimension larger than the inner transverse dimension of the tube to be connected thereto; and a peripheral shoulder on its outer surface between the end and intermediate portions and serving as an abutment for the end of the tube to be connected thereby. The end portions are joined to their respective intermediate portions by a conical juncture increasing in diameter from the intermediate portion to the respective end portion.

As will be described more particularly below, such a construction is particularly useful when the connector is used for connecting a tube to a plate. Thus, when the respective end portions of the two half-sections are received within a bore formed in the plate and the threaded fastener is tightened to force apart the two half-sections, the conical juncture forces the ends of the intermediate portions of the half-sections firmly against the surface of the plate bordering the bore, to thereby firmly clamp the connector within the plate bore.

Further features and advantages of the invention will be apparent from the description below.

BRIEF DESCRIPTION OF THE DRAWINGS

The invention is herein described, by way of example only, with reference to the accompanying drawings, wherein:

FIG. 1 illustrates one form of shelving system in accordance witch the present invention;

FIGS. 2 and 3 illustrate one of the modular units and shelves in the shelving system of FIG. 1;

DESCRIPTION OF A PREFERRED EMBODIMENT

Figure 4:
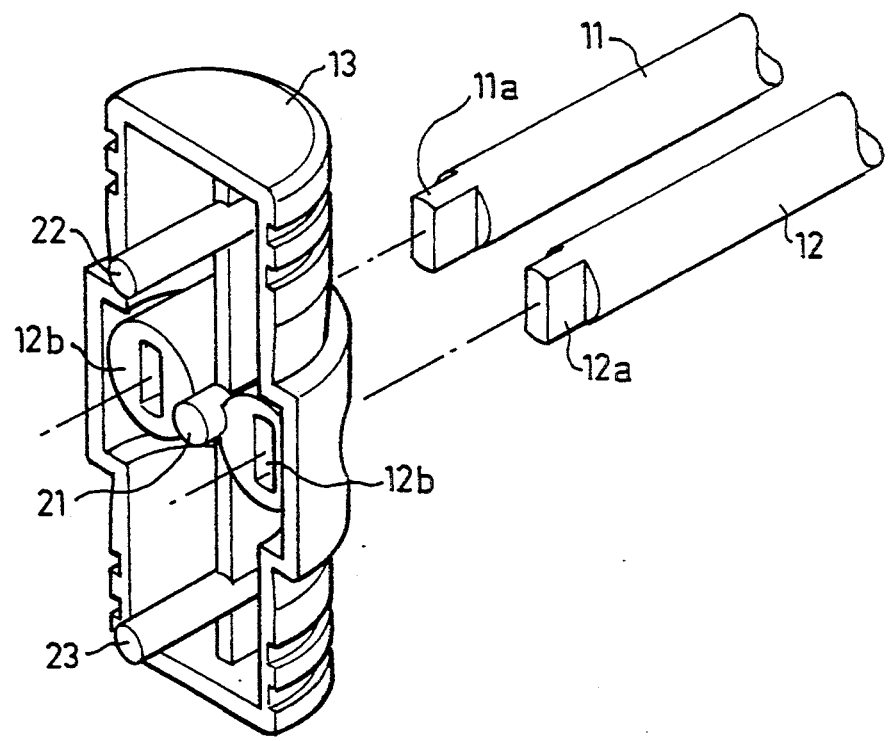
FIGS. 4 and 5 more particularly illustrate the construction of each of the tube connectors in the modular units of FIGS. 2 and 3.

FIG. 1 illustrates a typical shelf assembly constructed by the use of the tube connectors and modular units according to the present invention. The tube assembly illustrated in FIG. 1, generally designated 2, includes an assembly of tubes 3 connected together by modular units 4 supporting a plurality of shelves 5, and a plurality of braces 6 for bracing the shelving assembly. The tubes 3 are described below as being of hollow cylindrical tubes, but may be of other configuration, such as hollow rectangular tubes. The modular units 4, described more particularly below particularly with respect to FIGS. 2–5, permit the tubes 3 to be assembled together according to any desired size or configuration and also serve as supports for the shelves 5. The braces 6 serve as diagonal bracings for the shelf assembly.

As shown particularly in FIG. 2, each of the modular units 4 includes a pair of connectors 10 joined together by a pair of tie rods 11, 12. Each of the connectors 10 includes two half-sections 13, 14, of semi-cylindrical configuration. The tie rods 11, 12 are secured to the inner half-sections 13 of the two connectors 10. The outer half-sections 14 of the two connectors are secured to their respective half-sections 13 by threaded fasteners 15 received within threaded openings 16 in their respective half-section. The braces 6 are secured to the connectors 10 in the assembled shelving (FIG. 1) by further threaded fasteners 17 which are received within threaded sockets formed in the connector fasteners 15.

Figure 5:
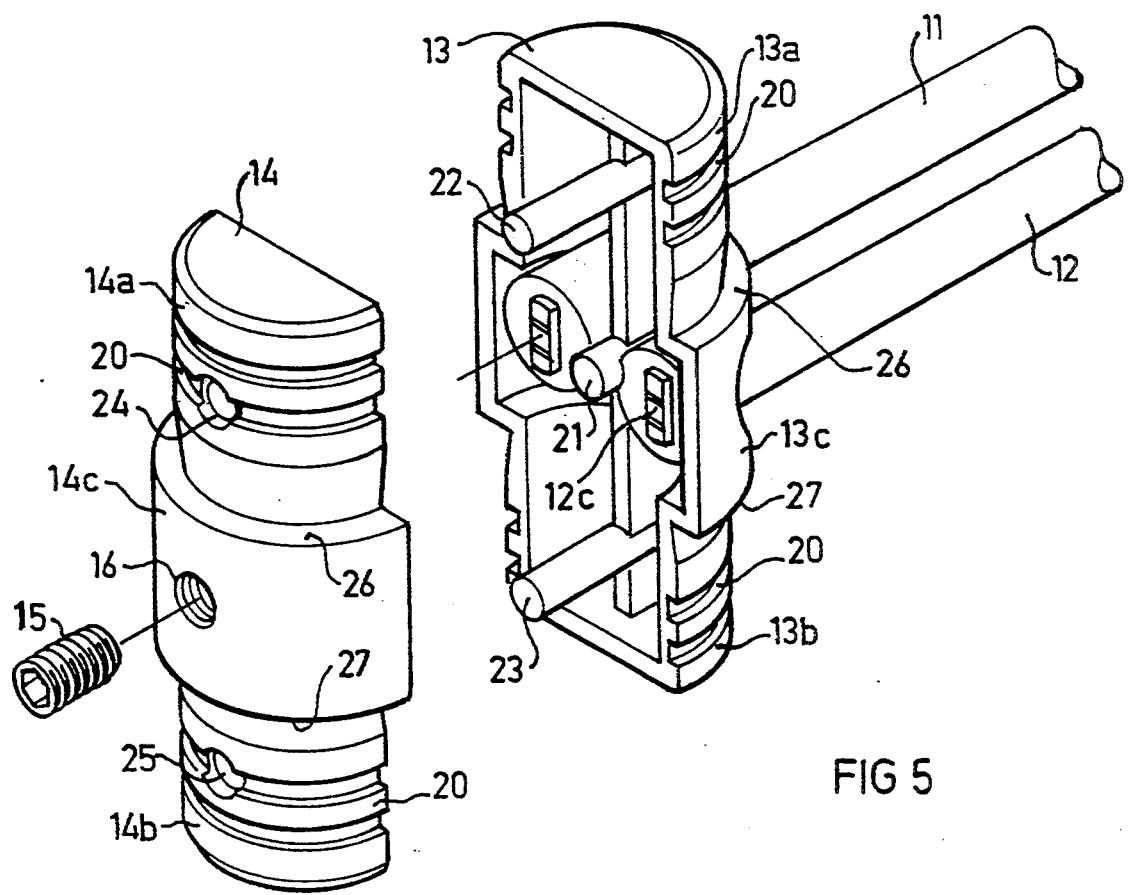

As shown particularly in FIGS. 4 and 5, the two tie rods 11, 12 are formed with non-circular tips 11a, 12a, received within non-circular holes 11b, 12b FIG. 4), and are fixed thereto by peening their tips, as shown at 11c, 12c (FIG. 5).

The structure of the two connector half-sections 13, 14 is more particularly illustrated in FIGS. 4 and 5. Thus, each connector half-section is formed with two end portions 13a, 13b and 14a, 14b which, together, are of slightly smaller transverse dimension than the inner transverse dimension of the tubes 3 which they connect together. Since the tubes 3 are of cylindrical configuration, the end portions 13a, 13b, 14a, 14b of the two connector half-sections are of semi-cylindrical configuration, of smaller diameter than the inner diameter of the tubes 2. The outer surfaces of these end portions are formed with circumferentially-extending, axially-spaced ribs 20 to firmly grip the inner surfaces of the tubes 3 when connected thereto.

The threaded openings 16 for receiving the threaded fasteners 15 are formed in the intermediate portions 14c of the outer connector half-section 14. The inner face of the inner connector half-section 13 is formed with an abutting surface or post 21 engageable by the end of fastener 15.

The inner face of each inner connector half-section 13 is further formed with a pair of pins 22, 23, on opposite sides of abutting surface 21. These pins 22, 23 are receivable within holes 24, 25 formed in the outer connector half-section 14, for locating the two half-sections to each other and for guiding the movement of one half-section with respect to the other when fastener 15 is tightened or loosened.

The intermediate portions 13c, 14c, of the two connector half-sections 13, 14 are also of semi-cylindrical configuration but of larger diameter than the inner diameter of the tubes 3. Thus, they form peripheral shoulders 26, 27 at their junctures with their outer portions 13a, 13b and 14a, 14b, respectively, engageable with the ends of the tubes 3.

The construction of the shelves 5 is particularly shown in FIG. 3. Each shelf includes a flat main section 5a of rectangular configuration and a downwardly-depending flange 5b along its four opposite sides. Each shelf 5 is supported by the tie rods 11 of two of the modular units 10 along the opposite long sides of the shelf. At the short sides of the shelf, the depending flanges 5b are inwardly bent, a shown at 5c, at their outer ends, for reinforcement purposes. Each shelf 5 is further formed with a curved cutout 5d at its four corners for accommodating the connectors 10 and the tubes 3 connected thereby.

Figure 6:
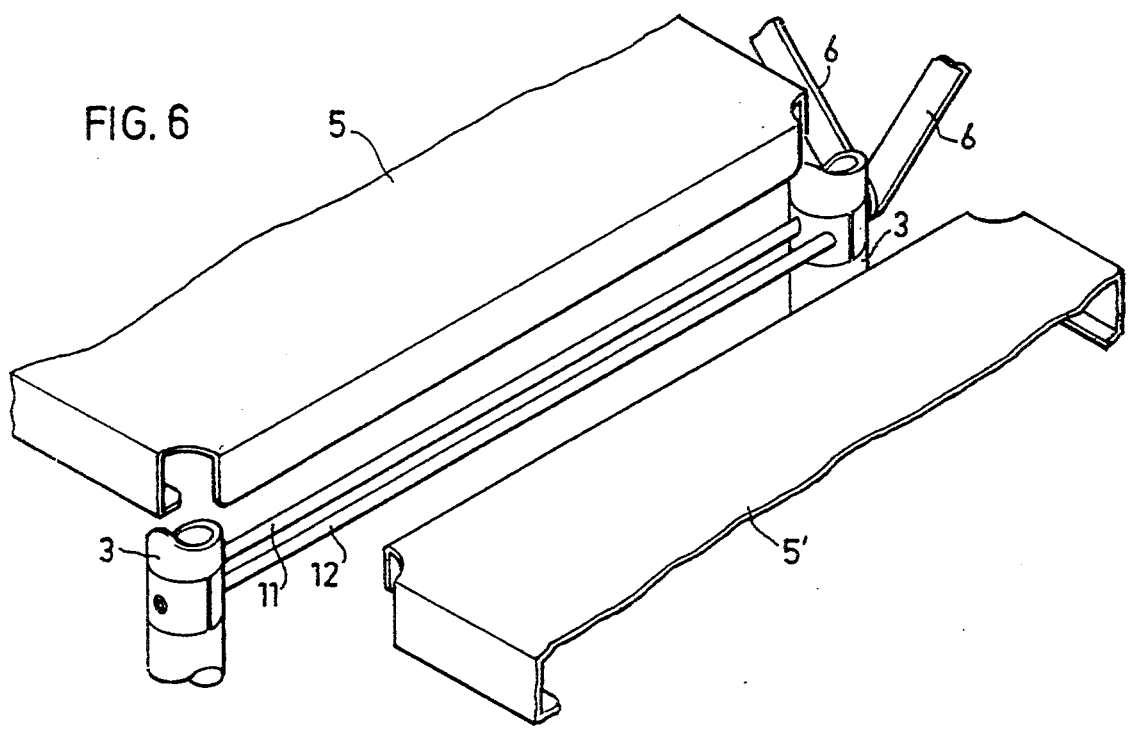
FIG. 6 illustrates a variation of FIG. 3 wherein each of the modular units is used to support two shelves on its opposite sides.

When only one shelf 5 is supported between a pair of modular units 4, as shown in FIG. 1, only one tie rod (e.g., 11) would be necessary, although the two tie rods (11 and 12) could be provided for reinforcement purposes. However, the second tie rod (e.g., 12), is particularly useful where the system is to support two shelves 5 in horizontal alignment with each other in which case the depending flange 5b of one shelf 5 would enclose tie rod 11, and the corresponding depending flange of the other, horizontally-aligned shelf 5 would enclose the other tie rod 12 as shown at 5' in FIG. 6.

The shelving system illustrated in FIGS. 1–6 is used in the following manner:

First, the plurality of tubes 3 are assembled into a framework by the use of the modular units 4 according to the desired size and configuration, e.g., as illustrated in FIG. 1. This is done by inserting a pair of tubes 3 into the outer portions 13a, 13b and 14a, 14b of the modular unit connectors 10, such that the ends of the tubes abut against the outer annular shoulders 26, 27 of the two connector half-sections 13, 14. Fastener 15 is then threaded through opening 16 to engage the abutting surface 21 on the inner face of the inner connector half-section 13, thereby forcing apart the two connector half-sections to firmly clamp them to the tubes 3.

After the framework has been assembled as described above, the diagonal braces 6 may be applied by fastener 17 threaded through openings in the ends of the braces and received within threaded openings in fasteners 15. The shelves 5 may then be applied by locating their flanges 5b between the two tie rods 11, 12 and resting their main sections 5a on the tie rods 11. If two horizontally-aligned shelves are to be applied, the second shelf would be applied in the same manner so as to rest on the tie rods 12, as shown at 5' in FIG. 6.

Figure 7:
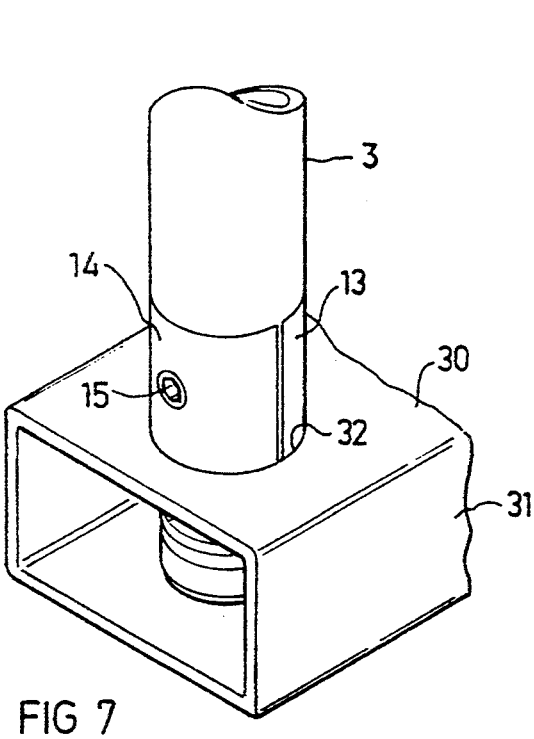
FIG. 7 illustrates a modular unit for attaching a tube to a plate, rather than to another tube.
Figure 8:
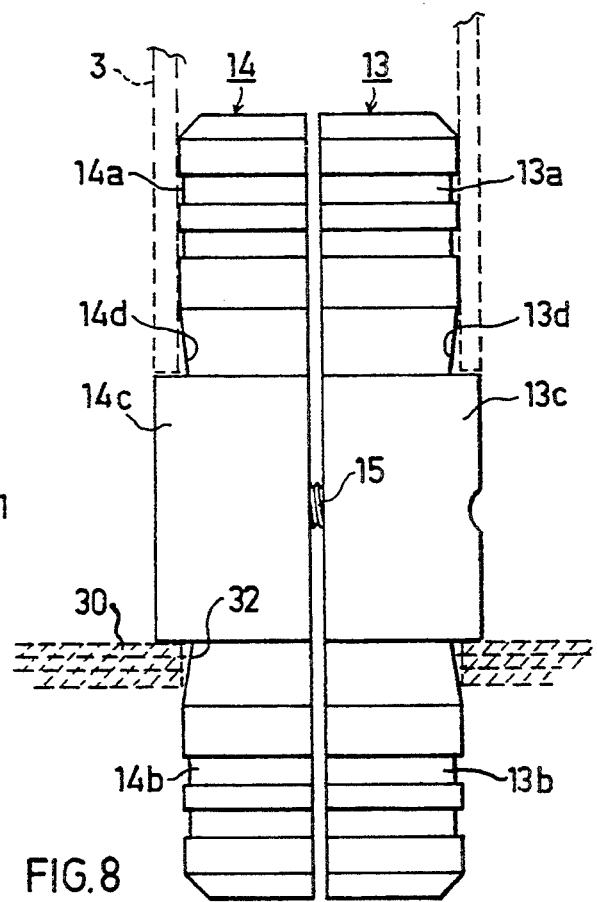
FIG. 8 illustrates the construction of the tube connector in FIG. 7 particularly useful when attaching a tube to a plate rather than to another tube.

FIGS. 7 and 8 illustrate a variation wherein the tube connector 10 is to be used for clamping a tube 3, not to another tube as described above, but rather to a flat plate 30, such as may be part of a supporting base 31. In this case, the flat plate 30 is formed with a cylindrical opening 32 receiving the respective end portions 13b, 14b of the connector half-sections 13, 14.

As shown particularly in FIG. 8, the junctures between the main portions 13c, 14c with the end portions 13a, 13b and 14a, 14b, respectively, are of conical configuration, as shown at 13d, 13e and 14d, 14e, increasing in diameter from the intermediate portions to the respective end portions. Such a construction is particularly useful where the connector is to be clamped to a plate 30. Thus, when the threaded fastener 15 is tightened to force apart the two connector half-sections 13, 14, the conical junctures 13e, 14e tend to move the shoulder 27 firmly against the surface of the plate 30 bordering its opening 32, thereby more firmly clamping the connector to the plate. The same force is produced when the connector is clamped to a tube 3, but since the surfaces of the end portions of the connector half-sections engage a longer length of the inner surface of the tube, this clamping effect produced by the conical junctures is less pronounced than in the case where the connector is clamped to a plate.

While the invention has been described with respect to a preferred embodiment, it will be appreciated that many other variations, modifications and applications of the invention may be made.

What is claimed is:

1. A modular unit for a shelving system, comprising:
    a pair of tube connectors each including first and second half-sections together having an outer transverse dimension slightly less than the inner transverse dimension of a tube to be connected thereto;
    said first half-section being formed with a threaded opening passing transversely therethrough for receiving a threaded fastener;
    said second half-section being formed on its inner face with an abutting surface engageable by the end of a threaded fastener, when threaded through said opening in the first half-section, to force apart the two half-sections and thereby to firmly clamp them to said tube;
    and a tie rod joining a half-section of one of said tube connectors to a half-section of the other of said tube connectors.

2. The modular unit according to claim 1, wherein said tie rod is formed with non-circular tips at its opposite ends received and fixed within non-circular holes in the respective connector half-sections.

3. The modular unit according to claim 1, wherein there are a pair of said tie rods joining one of the half-sections of one of said connectors to the corresponding half-section of the other of said connectors.

4. The modular unit according to claim 1, wherein one of said half-sections is formed with a guiding pin on its inner face receivable within a guiding hole in the other half-section.

5. The modular unit according to claim 4, wherein said half-sections are formed with a pair of guiding pins and guiding holes located on opposite sides of said threaded opening and abutting surface.

6. The modular unit according to claim 1, wherein each of said half-sections includes:
   an end portion having said outer transverse dimension slightly less than the inner transverse dimension of the tube to be connected thereto;
   an intermediate portion having an outer transverse dimension larger than the inner transverse dimension of the tube to be connected thereto;
   and a peripheral shoulder on its outer surface between said end and intermediate portions and serving as an abutment for the end of the tube to be connected thereby.

7. The modular unit according to claim 6, wherein said end portions are formed on their outer faces with a plurality of circumferentially-extending, axially-spaced ribs.

8. The modular unit according to claim 6, wherein each of said half-sections includes two of said end portions on opposite sides of said intermediate portion to enable the connector to connect a tube to another tube or to a plate formed with a bore for receiving the respective end portion of the two half-sections.

9. The modular unit according to claim 6, wherein said end portions are joined to their respective intermediate portions by a conical juncture increasing in diameter from the intermediate portion to the respective end portion.

10. A shelving system comprising:
    a plurality of modular units according to claim 1;
    a plurality of tubes to be assembled by said modular units;
    and a plurality of shelves each supportable along its opposite sides on the tie rods of two of said modular units when assembled together with their respective tubes.

11. The shelving system according to claim 10, wherein each of said shelves includes a main section supportable on the tie rods, and a depending flange along its opposite sides for enclosing the respective tie rods.

12. The shelving system according to claim 11, wherein each of said shelves is of rectangular configuration and is formed with said depending flanges along its four sides, and with cutouts at the ends of the flanges for accommodating the connectors and tubes at the ends of the modular units.

13. The shelving system according to claim 10, further including a plurality of braces each attachable at its opposite ends to a pair of connectors in an assembled shelving.

14. The shelving system according to claim 13, wherein said braces are attachable by further threaded fasteners received within threaded sockets formed in the threaded fasteners of the tube connectors in the shelving system.

* * * * *